United States Patent [19]

Wichelhaus et al.

[11] Patent Number: 4,791,164

[45] Date of Patent: Dec. 13, 1988

[54] POLYMERIC HOTMELT ADHESIVE

[75] Inventors: Juergen Wichelhaus, Wuppertal; Werner Gruber, Korschenbroich; Johannes Andres, Duesseldorf, all of Fed. Rep. of Germany

[73] Assignee: Henkel Kommanditgesellschaft auf Aktien, Duesseldorf, Fed. Rep. of Germany

[21] Appl. No.: 829,349

[22] Filed: Feb. 13, 1986

[30] Foreign Application Priority Data

Feb. 13, 1985 [DE] Fed. Rep. of Germany ....... 3504804

[51] Int. Cl.$^4$ .............................................. C08L 77/08
[52] U.S. Cl. .................................... 524/514; 525/183; 525/184
[58] Field of Search ................. 525/183, 184; 524/514

[56] References Cited

U.S. PATENT DOCUMENTS

| 3,626,026 | 12/1971 | Fukumura | 525/183 |
|---|---|---|---|
| 3,868,433 | 2/1975 | Bartz et al. | 260/876 |
| 3,987,122 | 10/1976 | Bartz et al. | 260/836 |
| 4,018,733 | 4/1977 | Lopez et al. | 260/27 |
| 4,132,690 | 1/1979 | Eernstman et al. | 525/184 |
| 4,181,775 | 1/1980 | Corke | 428/348 |
| 4,374,231 | 2/1983 | Douget | 525/183 |
| 4,409,373 | 10/1983 | Wiemers et al. | 525/432 |
| 4,554,320 | 11/1985 | Reimann et al. | 525/184 |
| 4,602,058 | 7/1986 | Graham et al. | 524/514 |

FOREIGN PATENT DOCUMENTS

| 3444096 | 6/1986 | Fed. Rep. of Germany | 525/183 |
|---|---|---|---|
| 219257 | 11/1985 | Japan | 525/183 |
| 2075991 | 11/1981 | United Kingdom | 525/183 |

*Primary Examiner*—John C. Bleutge
*Assistant Examiner*—David W. Woodward
*Attorney, Agent, or Firm*—Ernest G. Szoke; Henry E. Millson, Jr.; Wayne C. Jaeschke

[57] ABSTRACT

A hotmelt adhesive comprising a compatible mixture of at least one polyamide based on dimeric fatty acid, and at least one copolymer or terpolymer based on ethylene, a method for manufacturing the same, and a method for using the same to adhere plastics and metals.

57 Claims, No Drawings

POLYMERIC HOTMELT ADHESIVE

BACKGROUND OF THE INVENTION

1. Field of the Invention

This invention relates to a hotmelt adhesive based on a compatible polymer mixture of a polyamide and an ethylene copolymer. The polyamide contains dimeric fatty acids, while the ethylene copolymer contains carboxylic acid anhydride.

2. Statement of the Related Art

Hotmelt adhesives are growing in popularity in many branches of industry. They afford the user the advantage that they reach the necessary bond strength simply by cooling of the melt and, accordingly, may be used in high-speed production processes. Another advantage lies in the fact that no solvents are used, so that energy is no longer required either for drying or for recovering the solvents, nor are any measures necessary for preventing pollution of the working environment.

Polyamides are an important class of hotmelt adhesives. Among polyamides, those based on dimeric fatty acids are particularly important because polyamides such as these on the one hand have a relatively narrow softening range and, on the other hand, show no tendency towards crystallization and resulting embrittlement, even at temperatures below 0° C.

Although products such as these show excellent properties for numerous applications, efforts are still nevertheless being made to develop special hotmelt adhesives having even better adhesion properties. Thus, attempts have been made not only to modify the polyamides and to adapt them to the individual application envisaged by appropriate choice of the individual co-condensed units, but also to provide compatible polymer mixtures having special properties. In the present context, compatible polymer mixtures are understood to be mixtures which, in their solid state and up to the processing temperature above the melting point, appear to the eye to be homogeneous and of one phase. Physically, the polymer mixtures in question are either true solutions or finely divided dispersions of one polymer in the matrix of the other.

U.S. Pat. No. 4,018,733 describes compatible mixtures of: (a) an acidic copolymer based on ethylene having an acid number of from 3 to 80; (b) a polyamide having an amine number of from 70 to 400; and also other components; in an a:b weight ratio of 0.25-4:1. The polymer mixtures in question have adequate technical properties for solving numerous bonding problems. However, they are only suitable to a limited extent, if at all, for bonding extremely difficult materials, for example copper or non-pretreated polyethylene.

DESCRIPTION OF THE INVENTION

This invention provides a mixture of compatible ingredients constituting a hotmelt adhesive. The primary ingredients are: (I) at least one polyamide based on dimeric fatty acids, aliphatic amines, and modifying additives; and (II) copolymers of ethylene.

The hotmelt adhesives of this invention are capable of permanently bonding both non-treated polyethylene and copper. At the same time, the new hotmelt adhesive satisfies general requirement for low-temperature flexibility, as well as meeting the demands imposed on its fusion behavior and the stability of the molten material.

The hotmelt adhesives of this invention comprise a compatible mixture of:

I. at least one polyamide based on dimerized fatty acids;
II. at least one copolymer or terpolymer based on ethylene;
III. at least one compatibility promotor (optionally present);
IV. at least one adhesive auxiliary (optionally present); and
V. at least one standard hotmelt adhesive material (optionally present).

The above adhesive ingredients may be present in the following percentages by weight, all based upon the weight of the entire adhesive composition.

TABLE 1

| Ingredient (Adhesive) | Amount Present (Weight %) | | |
|---|---|---|---|
| | generally | preferred | most preferred |
| I | 5–95 | | |
| II | 5–95 | 5–60 | 10–30 |
| III | 0–30 | 2–8 | 3–5 |
| IV | 0–2 | 0.05–2 | |
| V | 0–30 | up to 30 | |

I. The at least one polyamide according to this invention comprises the following reaction ingredients:

(a) at least one dimeric fatty acid;
(b) at least one $C_{12-22}$-monomeric fatty acid;
(c) at least one polyether diamine (optionally present); and
(d) at least one $C_{2-40}$-aliphatic diamine.

The above polyamide ingredients may be present in the following amounts, based upon 100 mol % of the polyamide.

TABLE 2

| Ingredient (Polyamide) I | Amount Present (Mol %) | | |
|---|---|---|---|
| | first embodiment | | alternate embodiment |
| | generally | preferred | |
| a* | 35–49.5 | same | 20–49.5 |
| b | 0.5–15 | same | 0.5–15 |
| c | 2–35 | 4–10 | absent |
| d | 15–48 | 40–46 | 20–55 |

*up to ⅔ replaced by at least one $C_{4-12}$—aliphatic dicarboxylic acid.

The ratio (by weight) of acids (ingredients a+b) to amines (ingredients c+d) is about 0.67–1.5:1. When polyamides with amino end groups are desired, the mol % of amines is greater than that of the acids, although a ratio of about 1:1 is generally preferred.

II. The at least one copolymer or terpolymer according to this invention comprises the following reaction ingredients:

(a) ethylene;
(b) propylene (optionally present);
(c) at least one internal anhydride of ethylenically unsaturated carboxylic acid; and
(d) at least one methacrylate or acrylate, or both; and vinyl ester (optionally present).

The above copolymer/terpolymer ingredients may be present in the following percentages by weight, all based upon the weight of the entire copolymer/terpolymer.

TABLE 3

| Ingredient (Co/Ter-polymer) II | Amount Present (Weight %) | | |
|---|---|---|---|
| | generally | preferred | most preferred |
| A | 50–95 | 80–95 | 90–95 |

TABLE 3-continued

| Ingredient (Co/Ter-polymer) | Amount Present (Weight %) | | |
|---|---|---|---|
| | generally | preferred | most preferred |
| II | | | |
| B | (0–15% of ingredient A) | | absent |
| C | 2–30 | 2–5 | 2–4 |
| D | 5–30 | 5–15 | 5–7 |

Although the eminent suitability of the hotmelt adhesives according to the invention cannot be explained, the following is postulated from the superiority of the copolymers containing anhydride groups to the copolymers containing acid groups.

At the melting temperature of the systems, anhydride groups of the copolymer could react with groups of the polyamide containing acid hydrogen with ring opening of the anhydride. Such a reaction would produce molecules which contain both a polyamide block and also a copolymer block. Molecules such as these would then act as a quasi-emulsifier and reduce the interfacial tension of the various components of the polymer melt, thus preventing separation. Studies with an electron microscope have shown that the hotmelt adhesives according to the invention are at least partially non-homogeneous, in that one phase is finely dispersed in the other. It is assumed that the dispersed phase is the copolymer.

The copolymers (II) used in accordance with the invention mainly comprise ethylene, 0 to 15% by weight of which may be replaced by propylene. Suitable copolymers have a composition in the following range:

from 50 to 95% by weight of ethylene, from 5 to 30% by weight of acrylates of methacrylates of primary, aliphatic, linear or branched $C_{1-18}$ alcohols and from 2 to 30% by weight of the internal anhydride of a polymerizable carboxylic acid.

Cyclic anhydrides such as maleic acid anhydride, itaconic acid anhydride, and the like, are preferred. Maleic acid anhydride is of particular significance. (Meth)acrylates of particular significance are the methyl, ethyl, propyl, butyl, 2-ethylhexyl esters and esters with $C_{12-18}$ fatty alcohols, which may be unsaturated. In addition, the (meth)acrylates may be partly replaced by esters of vinyl alcohol such as vinyl acetate, or by vinyl esters of $C_{3-18}$ carboxylic acids.

In one particularly preferred embodiment of the invention, copolymers are used which contain from 80 to 95% by weight of ethylene, from 5 to 15% by weight of the above-mentioned esters of acrylic or methacrylic acid, or both, and from 2 to 5% by weight of the unsaturated anhydride, preferably maleic acid anhydride.

The copolymers preferably have a weight average molecular weight ($M_w$) of from about 50,000 to 250,000. Where the acrylate and methacrylate have a relatively long-chain alcohol group, relatively small percentages are generally used for producing the polymers used in accordance with the invention. Even with methacrylates, the alcohol component is preferably formed from a relatively long-chain alcohol, such a $C_{8-18}$ monoalcohol.

Although compatible mixtures of the polyamides and the copolymers may be formed with considerable certainty in the claimed range, it is nevertheless necessary in borderline cases to determine compatibility by simple preliminary tests. To this end, one may prepare melts of the constituents in the proposed mixing ratio and, after stirring, may wait and see whether any separation occurs. Thereafter, the melt is cooled and, at the same time, examined for clouding. If any separation occurs, one can reduce the quantity of copolymer and add the optional compatibility promoters described below.

The ethylene copolymers used in the polymer mixtures (blends) according to the invention are known per se. They may be produced in the usual way by radical polymerization and may be varied over wide molecular weight ranges, all of which is within the general specialist knowledge of the polymer chemist.

The hotmelt adhesives according to the invention contain as further components thermoplastic polyamides (I) based on dimeric fatty acids reacted with amines in a weight % ratio of 0.67–1.5:1. Polyamides such as these are known and have long been used as hotmelt adhesives. Polyamides of the following exemplary compositions are suitable for preparing the blends according to the invention:

(a) from 35 to 49.5 mol % of dimeric fatty acid, (b) from 0.5 to 15 mol % of $C_{12-22}$ monomeric fatty acid, (c) from 2 to 35 mol % of polyether diamines corresponding to the following general formula

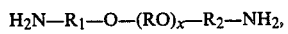
$$H_2N-R_1-O-(RO)_x-R_2-NH_2,$$

in which x is a number from 8 to 80, preferably from 8 to 40, $R_1$ and $R_2$ may be the same or different and represent aliphatic and/or cycloaliphatic hydrocarbon radicals and R is an optionally branched aliphatic $C_{1-6}$ hydrocarbon radical, and (d) from 15 to 48 mol % of $C_{2-40}$ aliphatic diamines; and (a) from 20 to 49.5 mol % of dimeric fatty acids which may contain up to 6 mol %, preferably up to 4 mol % and, more preferably, no more than 2 mol % of trimeric components, (b) from 0.5 to 15 mol % of $C_{12-22}$ monomeric fatty acids, and (c) (not present)

(d) from 20 to 55 mol % of a $C_{2-40}$ amine containing at least two primary amino groups.

In one particularly preferred embodiment, the polyamide used is prepared from (a) 35 to 49.5 mol % of dimeric fatty acids (containing trimeric components, as mentioned above), (b) 0.5 to 15 mol % of monomeric fatty acids, (c) 4 to 10 mol % of polyether diamines and (d) 40 to 46 mol % of aliphatic diamines.

In addition, the polyamides used in accordance with the invention may contain other raw materials of the kind commonly used in hotmelt adhesives, for example, aliphatic dicarboxylic acids are particularly common. Suitable aliphatic carboxylic acids preferably contain from 4 to 12 carbon atoms. Thus, for example, glutaric acid, maleic acid, succinic acid, adipic acid, pimelic acid, suberic acid and even sebacic acid are suitable. In molar terms up to two thirds of the dimerized fatty acids may be replaced by these acids. In this connection it is known to one of ordinary skill in this art that the melting point of polyamides may be increased within certain limits by addition of sebacic acid. Other raw materials which may be used in hotmelt adhesives are long-chain aminocarboxylic acids, such as 11-aminoundecanoic acid or lauryl lactam. The polyamide raw materials widely used in fiber chemistry, such as caprolactam, may also be used in small quantities. These materials enable one to increase the melting point within certain limits.

So far as the amine components in the polyamides are concerned, preference is attributed to polyether polyols containing at least two primary amino groups. Suitable polyether polyols containing terminal amino groups are based on polyethylene glycol, polypropylene glycol or polytetrahydrofuran. Polyether polyols containing terminal amino groups which are insoluble or only slightly soluble in water are preferred, particularly those having weight average molecular weights of from 700 to 3500 or even from 1200 to 2500. A particularly suitable class of raw materials are the bis-(3-aminopropyl)-polytetrahydrofurans have a molecular weight of from 700 to 3500 or the bis-(2-aminopropyl)-polyoxypropylenes having a molecular weight of from 1200 to 2500. It is also possible to use primary linear alkylene diamines containing from 2 to 10 carbon atoms, such as hexamethylene diamine, 1,3-diaminopropane, 1,4-diaminobutane. Piperazine is also suitable.

Another suitable class of diamines is derived from the dimer fatty acids and contains primary amino groups instead of the carboxyl groups. Compounds such as these are also frequently referred to as dimer diamines. They are obtained by nitrile formation from the dimerized fatty acids, followed by hydrogenation.

The following observations may be made on the molecular structure of the polyamides on which the compatible mixtures according to the invention are based: It is known to one of ordinary skill in this art that monofunctional, difunctional and trifunctional raw materials are used in a certain ratio to obtain fusible, i.e., noncrosslinked, products. General specialist knowledge of polymer chemistry applies here. In the event of crosslinking/gelation, it is then possible to arrive at formulations which do not have any tendency towards gelation, by reducing the percentage of trifunctional components (trimer fatty acids) and/or by increasing the content of monofunctional amines or fatty acids. The molecular weight of the hotmelts according to the invention is best calculated by terminal group titration of the terminal amino or acid groups via the molecular weight of the individual component. According to the invention, preferred hotmelts contain only one type of functional terminal groups, i.e., they are amines or carboxylic acids. For example, polyamides having a residual acid number show favorable properties. The residual acid number is in the range of from 1 to 50, preferably from 2 to 30, and more preferably from 4 to 12. However, polyamides containing terminal amino groups are preferred for numerous applications. They have amine number of from 2 to 15, preferably from 4 to 10.

Where polyamides such as these are used, incompatibilities may occasionally occur in the mixtures according to the invention. This is avoided by adding carboxylic acid anhydrides or fatty acid esters in substantially molar quantities, based on the terminal groups.

Surprisingly, the starting materials used for producing the polymer mixtures (blends) according to the invention are compatible with one another within wide limits. Thus, the quantity by weight of polyamide or of copolymer based on ethylene copolymer may be varied within the limits of 5 to 95%. In view of the adhesive properties, however, it is preferred to use copolymers based on ethylene in quantities of only 5 to 60% by weight. Particularly favorable results are obtained where only 10 to 30% by weight of the ethylene copolymer are present.

As already mentioned, the mixtures according to the invention are generally compatible, but may contain other components, primarily compatibility promoters. Suitable compatibility promoters are $C_{3-10}$ dicarboxylic acids or dicarboxylic acid anhydrides, for example the dicarboxylic acids which may be present in the polyamides, including dimer and trimer fatty acid. Other suitable compatibility promoters are esters of fatty acids, particularly esters of fatty acids with primary alcohols, such as methanol, ethanol, and the like. Organic solvents may also be used as compatibility promoters.

It can also be of advantage to use plasticizers. Suitable plasticizers are those based on phthalic acid esters, epoxy plasticizers, polyester plasticizers or the phosphoric acid triesters commercially available as plasticizers.

In another embodiment of this invention, tackifiers, such as various resins known to one of ordinary skill in this art, may also be used. The components mentioned above are generally used in quantities of no more than 30% by weight, based on the compatible mixtures as a whole. In many cases, however, quantities of from 2 to 8% by weight and more especially from 3 to 5% by weight are sufficient.

In addition to the components mentioned above, the compatible mixtures according to the invention may also contain auxiliaries of the type commonly used in adhesives, such as antioxidants, heat and light stabilizers, organic and inorganic fillers, pigments, perservatives or fungicides. These auxiliaries may be added in small quantities; many of them are normally added in quantities of from 0.05 to 2% by weight.

The compatible polymer mixtures according to the invention may be prepared in two ways. First, the starting components may be heated together beyond their melting points in the desired mixing ratios, preferably after mechanical size-reduction, and then mixed simply by stirring. Alternatively, solutions of the starting components, (typically in aromatic solvents, such as toluene, DMF, or similar solvents), may be mixed together and the hotmelts obtained from the resulting mixtures by evaporation of the solvent.

In another embodiment of the invention, the polymer mixtures according to the invention also may be formulated with other standard hotmelt adhesive raw materials. For example, up to 30% by weight of wax-like polyethylene may be added.

The hotmelt adhesives according to the invention are generally applied from the melt via feed or metering systems. The melt may be kept in reserve or may be obtained by melting down preformed adhesive moldings, such as cylinders, filaments, wires or other profiles. Immediately after application of the liquid adhesive film, the surfaces to be bonded are gently pressed together until the actual bond has formed.

In addition, it is possible to dissolve the new blends in suitable solvents and to apply them in that form to the surfaces to be bonded. In general, it is necessary in such case to form the bond by applying heat. This applies in particular in cases where one of the two surfaces to be bonded is not permeable to the solvent used. Finally, the adhesive may also be applied in the form of a suitable aqueous dispersion and the actual bond formed by applying heat after evaporation of the water.

The adhesives according to the invention are suitable for bonding a number of substrates. They may be used for bonding metals, such as iron, aluminum or nickel, metal alloys, such as brass, and in particular copper which would otherwise be difficult to bond. The adhesives according to the invention may also be used for bonding polar and apolar plastics, such as polyvinylchloride, polyesters, polycarbonates and other polymers. The hotmelt adhesives according to the invention are particularly suitable for bonding apolar polymers. In this connection, an outstanding property of the compositions acording to the invention is that polyethylene or polypropylene may be bonded with considerable strength without the otherwise usual pretreatment. Moreover, the bond strengths previously obtainable on these materials such as disclosed in U.S. Pat. No. 4,018,733) are exceeded. It is also emphasized that the individual components of the polymer mixtures taken alone are totally unsuitable for bonds of this type. The favorable low-temperature properties of the polymer mixtures according to the invention are of particular importance. Thus, no embrittlement was observed at temperatures of −20° C. or lower, even after prolonged storage.

EXAMPLES

Starting materials: to produce the thermoplastic polyamides based on dimerized fatty acids of natural $C_{10-18}$ fatty acids, the fatty acids were condensed in known manner with various amine components.

Table 4 below shows the quantities of fatty acids and amines used in parts by weight (g) and the resulting amine and acid numbers.

TABLE 4

| Polyamide | A | B | C |
|---|---|---|---|
| Polym. fatty acid (mono 1%); dim. 95%; trim. 4%) FAI | 265.0 | 285.0 | 108.3 |
| Stearic acid | 19.9 | — | 56.4 |
| Diaminoethane | 27.7 | 27.6 | 18.0 |
| Bis-(3-aminopropyl)-poly tetrahydrofuran (MW 1100) | 41.2 | — | — |
| Piperazine | — | — | 32.2 |
| Bis (2-aminopropyl)-polypropylene oxide (MW 2000) | — | 120.0 | — |
| Amine number | 1.0 | 2.9 | 0.5 |
| Acid number | 7.6 | 1.4 | 9.1 |

The terpolymers of ethylene, ethylacrylate and maleic acid anhydride used have the following compositions and properties:

| Terpolymer D | |
|---|---|
| Ethylene content | 91% by weight |
| Ethylacrylate | 6% by weight |
| Maleic acid anhydride | 3% by weight |
| Molecular weight ($M_w$) | 45,000–50,000 |
| Viscosity | 87,000 mPa.s/190° C. |
| Softening range | 80–100° C. |
| Terpolymer E | |
| Ethylene content | 91.5% by weight |
| Ethylacrylate | 5.5% by weight |
| Maleic acid anhydride | 3.0% by weight |
| Molecular weight ($M_w$) | 80,000–85,000 |
| Viscosity | 178,000 mPa.s/190° C. |
| Softening range | 85–105° C. |

The polyamide blends were prepared by melting the particular polyamides A, B and C together with the terpolymers D and E at 210° C. in an inert gas atmosphere.

The quantities in % by weight in which the components were used are shown in Table 5 below under the Example No.

TABLE 5

| | Example No. (% by weight) | | | | |
|---|---|---|---|---|---|
| Components | 1 | 2 | 3 | 4 | 5 |
| Polyamide: | | | | | |
| A | 80 | 58 | | | |
| B | | | 88 | | |
| C | | | | 78 | 67 |
| Terpolymer: | | | | | |
| D | 20 | 42 | | | |
| E | | | 12 | 22 | 33 |
| | 100 | 100 | 100 | 100 | 100 |

Table 6 below shows the physical properties of the products obtained in accordance with the Examples, while Table 7 shows the tensile peel strengths in accordance with DIN (German Industrial Norm) 53, 282 at 20° C. and at a peel rate of 50 mm/sec.

TABLE 6

| | Physical properties of the polyamide blends | | |
|---|---|---|---|
| Example No. | Softening point (°C.) | Viscosity mPa.s/200° C. | Mandrell breaking point (°C.) |
| 1 | 152 | 9,000 | −40 |
| 2 | 135 | 22,300 | −50 |
| 3 | 136 | 60,000 | −25 |
| 4 | 135 | 12,600 | −40 |
| 5 | 132 | 22,800 | −45 |

TABLE 7

| Tensile peel strength in N/25 mm on various materials | | | | | |
|---|---|---|---|---|---|
| Example No. | Cu/PE | Al/PE | Al/PVC | Cu/Cu | Al/Al |
| 1 | 150 | 80 | 80 | 150 | 80 |
| 2 | 80 | 64 | 34 | 80 | 64 |
| 3 | 38 | — | 72 | 38 | 72 |
| 4 | 125 | 46 | 46 | 125 | 46 |
| 5 | 85 | 58 | 38 | 85 | 56 |

The tests applied are summarized and characterized below.

1. R+B (softening point)

The softening point in °C. was measured by the ring-+ball method (R+B) according to ASTM E-28.

2. Viscosity

Viscosity was measured in mPa.s using a type RVT "Brookfield Thermocel" viscosimeter (spindle 27) at 160° C. or 200° C.

3. Peel strength

Peel strength was determined by the T-peel test on extrudable polymers of polyethylene and PVC, of the type used for making cables, and Cu and Al foils 200 and 100 microns thick which had been subjected to another pretreatment.

Test specimens: 120−25×0.2 mm overlap 50 mm

Bonding: a 1 mm thick polyamide blend film was positioned between the materials to be bonded which were then joined in a press for 45 seconds at 7 bar/200° C.

Conditioning: 24 h at 20° C./approx. 60% relative air humidity.

4. Testing

20° C., 50 mm peel rate.

We claim:

1. A hot melt adhesive comprising:

I: a polyamide consisting essentially of the reaction product of:
(a) about 20 to 49.5 mol%, based upon 100 mol% of polyamide, of dimerized fatty acid or dimerized fatty acid replaced with at least one $C_4$-$C_{12}$-aliphatic dicarboxylic acid in an amount up to about ⅔ of said dimerized fatty acid on a molar basis;
  (b) about 0.5 to 15 mol %, based upon 100 mol % of polyamide, of at least one $C_{12}$–$C_{22}$ monomeric fatty acid; and
  (c) about 20 to 55 mol %, based upon 100 mol% of polyamide, of at least one $C_2$–$C_{40}$-aliphatic diamine;
wherein the weight ratio of the fatty acids (a+b) to the diamine (c) is from about 0.67 with the proviso that the polyamide has an amine number of 15 or less and
II: a terpolymer based on ethylene consisting essentially of the reaction product of:
  (a) from about 50 to 95% by weight, based on the total weight of the terpolymer, of monomer selected from the group consisting of (i) ethylene; and (ii) ethylene and propylene, wherein the propylene is present in an amount up to about 15% by weight of ethylene;
  (b) from about 2 to 30% by weight, based upon the total weight of the terpolymer, of at least one internal anhydride of an ethylenically unsaturated carboxylic acid; and
  (c) from about 5 to 30% by weight, based on the total weight of terpolymer, of an ester selected from the group consisting of (i) an ester of acrylic acid with a linear or branched $C_1$–$C_{18}$ aliphatic primary alcohol; (ii) an ester of methacrylic acid with a linear or branched $C_1$–$C_{18}$-aliphatic primary alcohol; (iii) a mixture thereof; and (iv) said acrylic acid ester or methacrylic acid ester, or mixture thereof, with an ester of vinyl alcohol and a $C_2$–$C_{18}$ carboxylic acid
Wherein said polyamide and said ethylene-based terpolymer are each present in an amount of from about 5 to 95% by weight, based on the weight of the adhesive.

2. The adhesive of claim 1 wherein said polyamide has terminal acid groups and has an acid number of about 2 to 30.

3. The adhesive of claim 1 wherein said polyamide has terminal amino groups and has an amine number of about 2 to 15.

4. The adhesive of claim 1 wherein said polyamide has terminal amino groups and has an amine number of about 4 to 10.

5. The adhesive of claim 1 wherein said polyamide I is the reaction product of:
  polymerized fatty acid consisting of 1% monomers, 95% dimers and 4% trimers;
  stearic acid;
  diaminoethane; and
  piperazine;
and wherein said polyamide has an amine number of about 0.5 and an acid number of about 9.1.

6. The adhesive of claim 5 wherein said terpolymer II is the reaction product of:
  ethylene;
  ethylacrylate; and
  maleic anhydride;
and has a $M_w$ of about 45,000 to 50,000.

7. The adhesive of claim 5 wherein said terpolymer II is the reaction product of:
  ethylene;
  ethylacrylate; and
  maleic acid anhydride;
and has a $M_w$ of about 80,000 to 85,000.

8. The adhesive of claim 1, wherein the ethylene-based terpolymer is present in a amount of from about 5 to 60% by weight of the total weight of adhesive.

9. The adhesive of claim 1, wherein the ethylene-based terpolymer is present in an amount of from about 10 to 30% by weight of the total weight of adhesive.

10. The adhesive of claim 1, wherein said monomer is present in an amount of from about 80 to 95% by weight; the anhydride is present in an amount of from about 2 to 5% by weight and the ester is present in an amount of from about 5 to 15% by weight.

11. The adhesive of claim 1, wherein said monomer is ethylene which is present in an amount of from about 90 to 95% by weight; the anhydride is present in an amount of from about 2 to 4% by weight and the ester is present in an amount of from about 5 to 7% by weight.

12. The adhesive of claim 10, wherein the monomer is ethylene.

13. The adhesive of claim 1, wherein the anhydride is a cyclic anhydride.

14. The adhesive of claim 13, wherein the anhydride is maleic acid or itaconic acid anhydride.

15. The adhesive of claim 12, wherein the anhydride is maleic acid anhydride.

16. The adhesive of claim 1, wherein the acrylic acid or methacrylic acid ester is a methyl, ethyl, propyl, butyl, or 2-ethylhexyl ester, or an ester with a saturated or unsaturated $C_{12}$–$C_{18}$ fatty alcohol.

17. The adhesive of claim 1, wherein the acrylic acid or methacrylic acid ester is an ester of the acid with a $C_8$–$C_{18}$ monoalcohol.

18. The adhesive of claim 1, wherein the ethylene-based terpolymer has a weight average molecular weight from about 50,000 to about 250,000.

19. The adhesive of claim 1, wherein the dimerized fatty acid component of the polyamide includes no more than about 4 mol% of trimeric fatty acid.

20. The adhesive of claim 1, wherein the dimerized fatty acid component of the polyamide includes no more than about 2 mol% of trimeric fatty acid.

21. The adhesive of claim 1, further comprising at least one of the following ingredients:
  (III) at least one compatibility promoter in an amount up to about 30% by weight of the adhesive;
  (IV) at least one adhesive auxiliary in an amount up to about 2% by weight of the adhesive; and
  (V) at least one standard hotmelt adhesive material in an amount up to about 30% by weight of the adhesive.

22. The adhesive of claim 21, wherein said compatibility promotor is present in an amount of from about 2 to 8% by weight and said adhesive auxiliary is present in an amount of from about 0.05 to 2% by weight.

23. A hot melt adhesive comprising:
I: a polyamide consisting essentially of the reaction product of:
  (a) about 35 to 49.5 mol %, based upon 100 mol % of polyamide, of dimerized fatty acid or dimerized fatty acid replaced with at least one $C_4$–$C_{12}$ aliphatic dicarboxylic acid in an amount up to about ⅔ of said dimerized fatty acid on a molar basis;
  (b) about 0.5 to 15 mol %, based upon 100 mol % of polyamide, of at least one $C_{12}$–$C_{22}$ monomeric fatty acid;
  (c) about 2 to 35 mol %, based upon 100 mol % polyamide, of at least one polyether diamine; and
  (d) about 15 to 48 mol %, based upon 100 mol % polyamide, of at least one $C_2$–$C_{40}$ aliphatic diamine;
wherein the weight ratio of the fatty acids (a+b) to the diamines (c+d) is from about 0.67 with the proviso that the polyamide has an amine number of 15 or less and II: a terpolymer based on ethylene consisting essentially of the reaction product of:
  (a) from about 50 to 95% by weight, based on the total weight of the terpolymer, of monomer selected from the group consisting of (i) ethylene; and (ii) ethylene and propylene, wherein the propylene is present in an amount up to about 15% by weight of ethylene;
  (b) from about 2 to 30% by weight, based upon the total weight of the terpolymer, of at least one internal anhydride of an ethylenically unsaturated carboxylic acid; and
  (c) from about 5 to 30% by weight, based on the total weight of terpolymer, of an ester selected from the group consisting of (i) an ester of acrylic acid with a linear or branched $C_1$-$C_{18}$ aliphatic primary alcohol; (ii) an ester of methacrylic acid with a linear or branched $C_1$-$C_{18}$ aliphatic primary alcohol; (iii) a mixture thereof; and (iv) said acrylic acid ester or methacrylic acid ester or mixture thereof, with an ester of vinyl alcohol and a $C_2$-$C_{18}$ carboxylic acid, Wherein said polyamide and said ethylene-based terpolymer are each present in an amount of from about 5 to 95% by weight, based on the weight of the adhesive.

24. The adhesive of claim 23 wherein in said polyamide:
  (c) is present in 4–10 mol%; and
  (d) is present in 40–46 mol%.

25. The adhesive of claim 24, wherein the dimerized fatty acid component of the polyamide includes no more than about 6 mol% of trimeric fatty acid.

26. The adhesive of claim 24, wherein the dimerized fatty acid component of the polyamide includes no more than about 4 mol% of trimeric fatty acid.

27. The adhesive of claim 24, wherein the dimerized fatty acid component of the polyamide includes no more than about 2 mol% of trimeric fatty acid.

28. The adhesive of claim 23 wherein said polyether diamine has the formula:

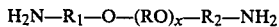

in which:
  x is an integer from 8 to 80;
  $R_1$ and $R_2$ are at least one aliphatic or cycloaliphatic hydrocarbon and may be the same or different; and
  R is a branched or unbranched $C_{1-16}$-aliphatic hydrocarbon radical.

29. The adhesive of claim 23 wherein said polyamide has terminal acid groups and has an acid number of about 1 to 5.

30. The adhesive of claim 23 wherein said polyamide has terminal acid groups and has an acid number of about 2 to 30.

31. The adhesive of claim 23 wherein said polyamide has terminal acid groups and has an acid number of about 4 to 12.

32. The adhesive of claim 23 wherein said polyamide has terminal amino groups and has an amine number of about 2 to 15.

33. The adhesive of claim 23 wherein said polyamide I is the reaction product of:
  polymerized fatty acid consisting of 1% monomers, 95% dimers and 4% trimers;
  stearic acid;
  diaminoethane; and
  bis-(3-aminopropyl)-polytetrahydrofuran-M.W. 1,100;
and wherein said polyamide has an amine number of about 1.0 and an acid number of about 7.6.

34. The adhesive of claim 23 wherein said polyamide I is the reaction product of:
  polymerized fatty acid consisting of 1% monomers, 95% dimers and 4% trimers;
  diaminoethane; and
  bis-(3-aminopropyl)-polypropylene oxide-M.W. 2,000;
and wherein said polyamide has an amine number of about 2.9 and an acid number of about 1.4.

35. The adhesive of claim 23 wherein said terpolymer II is the reaction product of:
  ethylene;
  ethylacrylate; and
  maleic anhydride;
and has a $M_w$ of about 45,000 to 50,000.

36. The adhesive of claim 33 wherein said terpolymer II is the reaction product of:
  ethylene;
  ethylacrylate; and
  maleic anhydride;
and has a $M_w$ of about 45,000 to 50,000.

37. The adhesive of claim 34 wherein said terpolymer II is the reaction product of:
  ethylene;
  ethylacrylate; and
  maleic anhydride;
and has a $M_w$ of about 45,000 to 50,000.

38. The adhesive of claim 23 wherein said terpolymer II is the reaction product of:
  ethylene;
  ethylacrylate; and
  maleic acid anhydride;
and has a $M_w$ of about 80,000 to 85,000.

39. The adhesive of claim 33 wherein said terpolymer II is the reaction product of:
  ethylene;
  ethylacrylate; and
  maleic acid anhydride;
and has a $M_w$ of about 80,000 to 85,000.

40. The adhesive of claim 34 wherein said terpolymer II is the reaction product of:
  ethylene;
  ethylacrylate; and
  maleic acid anhydride;
and has a $M_w$ of about 80,000 to 85,000.

41. The adhesive of claim 35 wherein said:
  ethylene is present in 90–95%;
  ethylacrylate is present in 5–7%; and
  maleic anhydride is present in 2–4%;
all percentages being by weight and based upon the total weight of the terpolymer.

42. The adhesive of claim 38 wherein said:
  ethylene is present in 90–95%;
  ethylacrylate is present in 5–7%; and
  maleic anhydride is present in 2–4%;
all percentages being by weight and based upon the total weight of the terpolymer.

43. The adhesive of claim 23, wherein the ethylene-based terpolymer is present in an amount of from about 5 to 60% by weight of the total weight of adhesive.

44. The adhesive of claim 23, wherein the ethylene-based terpolymer is present in an amount of from about 10 to 30% by weight of the total weight of adhesive.

45. The adhesive of claim 23, wherein said monomer is present in an amount of from about 80 to 95% by weight; the anhydride is present in an amount of from about 2 to 5% by weight; and the ester is present in an amount of from about 5 to 15% by weight.

46. The adhesive of claim 23, wherein said monomer is ethylene which is present in an amount of from about 90 to 95% by weight; the anhydride is present in an amount of from about 2 to 4% by weight and the ester is present in an amount of from about 5 to 7% by weight.

47. The adhesive of claim 45, wherein the monomer is ethylene.

48. The adhesive of claim 23, wherein the anhydride is a cyclic anhydride.

49. The adhesive of claim 48, wherein the anhydride is maleic acid or itaconic acid anhydride.

50. The adhesive of claim 47, wherein the anhydride is maleic acid anhydride.

51. The adhesive of claim 23, wherein the acrylic acid or methacrylic acid ester is a methyl, ethyl, propyl, butyl, or 2-ethylhexyl ester, or an ester with a saturated or unsaturated $C_{12}$–$C_{18}$ fatty alcohol.

52. The adhesive of claim 23, wherein the acrylic acid or methacrylic acid ester is an ester of the acid with a $C_8$–$C_{18}$ monoalcohol.

53. The adhesive of claim 23, wherein the ethylene-based terpolymer has a weight average molecular weight from about 50,000 to about 250,000.

54. The adhesive of claim 1, wherein the dimerized fatty acid component of the polyamide includes no more than about 6 mol% of trimeric fatty acid.

55. The adhesive of claim 23, further comprising at least one of the following ingredients:
(III) at least one compatibility promoter in an amount up to about 30% by weight of the adhesive;
(IV) at least one adhesive auxiliary in an amount up to about 2% by weight of the adhesive; and
(V) at least one standard hotmelt adhesive material in an amount up to about 30% by weight of the adhesive.

56. The adhesive of claim 55 wherein said compatibility promoter III is at least one $C_{3\text{-}10}$ carboxylic acid anhydride, fatty acid ester, plasticizer, or organic solvent.

57. The adhesive of claim 55, wherein said compatibility promotor is present in an amount of from about 2 to 8% by weight and said adhesive auxiliary is present in an amount of from about 0.05 to 2% by weight.

* * * * *